United States Patent
Swann et al.

[11] Patent Number: 5,904,369
[45] Date of Patent: May 18, 1999

[54] CATALYTICALLY PLATED AIR BAG

[75] Inventors: Timothy A. Swann; Bryan W. Shirk, both of Mesa, Ariz.

[73] Assignee: TRW Inc., Lyndhurst, Ohio

[21] Appl. No.: 08/997,135

[22] Filed: Dec. 23, 1997

[51] Int. Cl.$^6$ .................................................. B60R 21/16
[52] U.S. Cl. ....................................................... 280/743.1
[58] Field of Search .............................. 280/743.1, 728.1

[56] References Cited

U.S. PATENT DOCUMENTS

| | | |
|---|---|---|
| 5,584,507 | 12/1996 | Khandhadia et al. . |
| 5,684,562 | 11/1997 | Jordan et al. ......................... 280/743.1 |
| 5,700,532 | 12/1997 | Chiou .................................... 280/743.1 |

FOREIGN PATENT DOCUMENTS

| | | | |
|---|---|---|---|
| 4-201650 | 7/1992 | Japan ................................. | 280/728.1 |

*Primary Examiner*—Eric D. Culbreth
*Attorney, Agent, or Firm*—Tarolli, Sundheim, Covell, Tummino & Szabo

[57] ABSTRACT

An apparatus comprising an inflatable vehicle occupant protection device (12) for, when inflated, helping to protect a vehicle occupant in the event of a vehicle collision. The protection device (12) has an inner surface (28) defining a volume (27) into which vehicle inflation fluid is directed to inflate the protection device. A source (14) of inflation fluid is provided which, when actuated, provides inflation fluid for inflating the protection device (12). A catalytic reducing material (50) for reducing components of the inflation fluid is adhered to at least a portion of the inner surface (28) of the protection device (12).

13 Claims, 1 Drawing Sheet

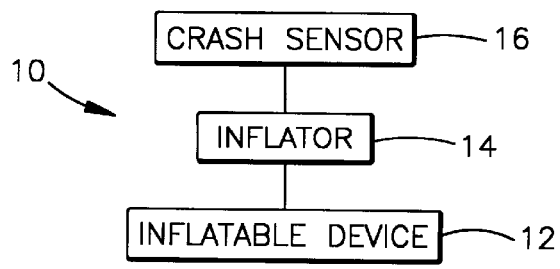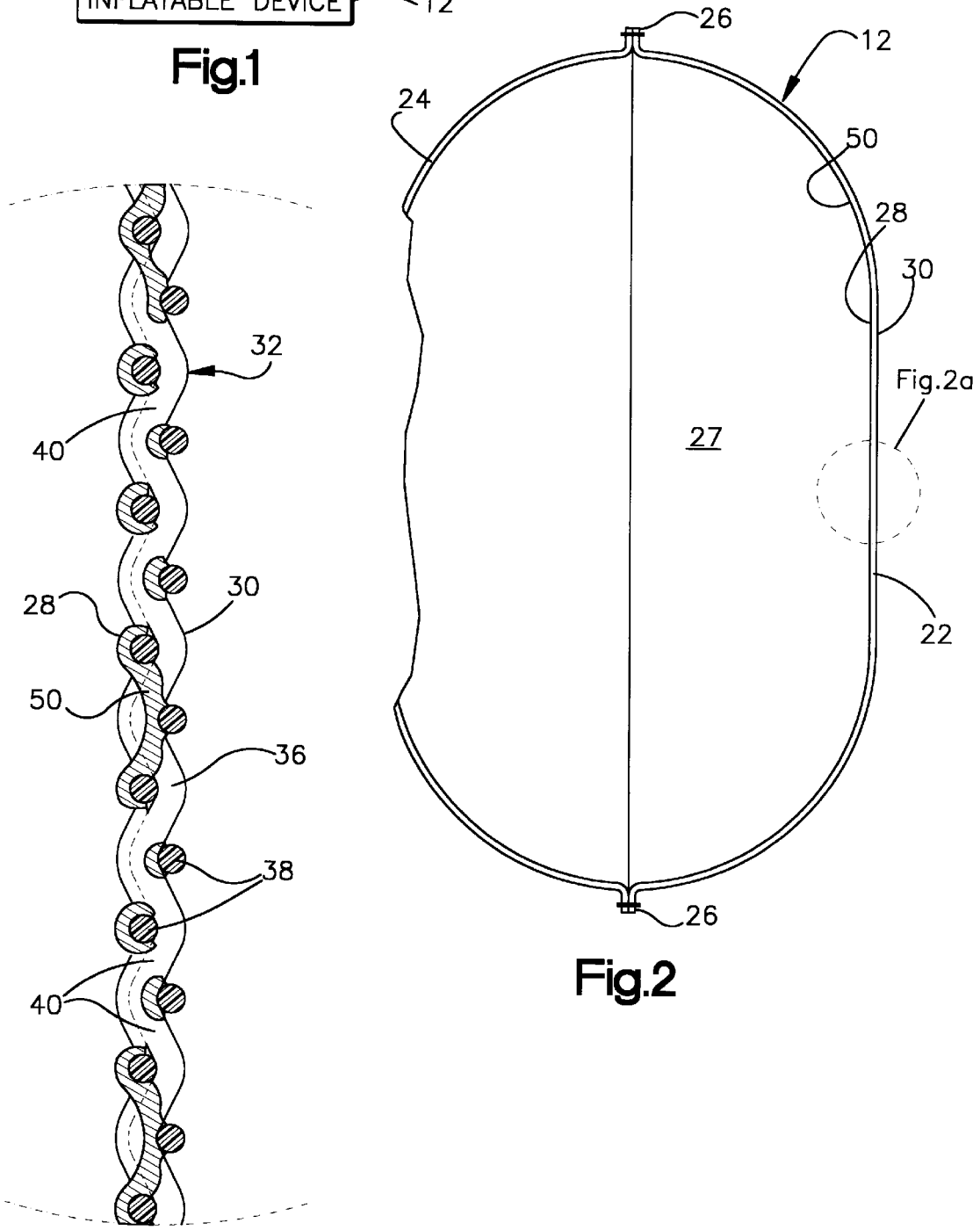

CATALYTICALLY PLATED AIR BAG

TECHNICAL FIELD

The present invention relates to an apparatus for helping to protect a vehicle occupant in the event of a vehicle collision, and particularly relates to an air bag plated with a catalytic material.

BACKGROUND OF THE INVENTION

A known vehicle occupant protection system includes a vehicle occupant protection device, such as an air bag, and an inflator which provides inflation fluid to inflate the air bag. The air bag may be made of a gas permeable material and the inflation fluid may contain a quantity of nitrogen oxides ($NO_x$) . It is desirable to reduce any $NO_x$ in the inflation fluid before the $NO_x$ can pass through the porous material of the air bag.

SUMMARY OF THE INVENTION

The apparatus of the present invention comprises an inflatable vehicle occupant protection device for, when inflated, helping to protect a vehicle occupant in the event of a vehicle collision. The protection device has an inner surface defining a volume into which inflation fluid is directed to inflate the protection device. The present invention further includes a source of inflation fluid which, when actuated, provides inflation fluid for inflating the protection device. A catalytic reducing material, for reducing components of the inflation fluid, is adhered to at least a portion of the inner surface of the protection device.

BRIEF DESCRIPTION OF THE DRAWINGS

The foregoing and other features of the invention will become more apparent to one skilled in the art upon consideration of the following description of the invention and the accompanying drawings in which:

FIG. 1 is a schematic view of a vehicle occupant protection system embodying the present invention;

FIG. 2 is a schematic sectional view of a part of the vehicle occupant protection system of FIG. 1; and FIG. 2a is an enlarged view of the part of the vehicle occupant protection system of FIG. 2.

DESCRIPTION OF PREFERRED EMBODIMENTS

Referring to FIG. 1, a vehicle occupant protection system 10 includes an inflatable vehicle occupant protection device 12. In the preferred embodiment of the present invention, the inflatable vehicle occupant protection device 12 is an air bag. The inflatable vehicle occupant protection device could be, for example, an inflatable seat belt, an inflatable knee bolster, an inflatable head liner or side curtain, or a knee bolster operated by an inflatable air bag.

An inflator 14 is associated with the inflatable air bag 12. The inflator 14 includes an ignitable propellant (not shown) which, when ignited, produces a gas which includes nitrogen oxides ($NO_x$), such as nitrogen oxide (NO) and nitrogen dioxide ($NO_2$), and a relatively large amount of heat. Depending on the type of inflator 14, the gas produced by the ignited propellant can either form an inflation fluid by itself or mix with a quantity of a stored gas, such as argon, to form an inflation fluid. The inflator 14, when actuated, directs the inflation fluid to the air bag 12 to inflate the air bag.

The system 10 also includes a crash sensor 16. The crash sensor 16 is a known device that senses a vehicle condition, such as vehicle deceleration, indicative of a collision. The crash sensor 16 measures the magnitude and duration of the deceleration. If the magnitude and duration of the deceleration meet or exceed predetermined threshold levels, a deployment signal is then transmitted to the inflator 14 to actuate the inflator.

When the inflator 14 is actuated, it directs the inflation fluid into the air bag 12 to inflate the air bag. When the air bag 12 is inflated, it extends into the occupant compartment of the vehicle to help protect a vehicle occupant from a forceful impact with parts of the vehicle.

In accordance with the present invention, the air bag 12 (FIG. 2) includes a front panel 22 and a back panel 24. The panels 22 and 24 are sewn together at a side seam 26 to form the air bag 12. The panels 22 and 24 define an inflation fluid volume 27 in the air bag 12. The air bag 12 includes an inner surface 28 and an exterior surface 30.

The panels 22 and 24 of the air bag 12 are made of a woven fabric 32 (FIG. 2a), such as a woven nylon. The woven fabric 32 could also be polyester or polypropylene. The woven fabric 32 includes a plurality of warp threads 36 which are interwoven with a plurality of fill threads 38 to form the woven fabric. Openings 40 are formed between the interwoven threads 36 and 38 of the woven fabric. Thus, the woven fabric 32 is gas permeable.

The panels 22 and 24 are plated with a catalyst 50 (i.e., a substance which notably increases the rate of a chemical reaction without itself being consumed or undergoing a chemical change) on the inner surface 28 of the air bag 12. The catalyst 50 covers portions of the threads 36, 38 so that the air bag 12, with the catalyst 50 covering portions of the threads, is gas permeable. Thus, gas is capable of permeating through the air bag 12 by passing through the openings 40, and/or the portions of the openings that are not obstructed by the catalyst 50.

The catalyst 50 reduces the amount of $NO_x$ in the inflation fluid which contacts the catalyst 50 by speeding up the chemical reduction, or dissociation of the $NO_x$ to $N_2$ and $O_2$ without itself (i.e., the catalyst) being consumed or undergoing a chemical change. The catalyst 50 is a noble metal. The catalyst 50 could be palladium, platinum, gold, iridium, silver, rhenium, mercury, ruthenium, osmium, rhodium or mixtures thereof. Preferably, the catalyst 50 is palladium.

The catalyst 50 is preferably vacuum deposited on relatively large sheets of woven fabric 32 before the panels 22 and 24 are cut from the sheets of woven fabric 32. The catalyst 50 is preferably deposited on the woven fabric 32 so that the catalyst has a thickness of about 1–2 angstroms on the threads 36 and 38 of the woven fabric.

Upon the occurrence of sudden vehicle deceleration indicative of a collision for which inflation of the occupant protection device 12 is desired, the sensor 16 causes a deployment signal to be transmitted to the inflator 14 to cause the inflator to generate the inflation fluid. The heat from the combustion of the propellant results in the inflation fluid having a temperature of about 700° C. The inflation fluid flows into the air bag 12, to inflate the air bag into a predetermined position for protecting a vehicle occupant.

The inflation fluid flows through the openings 40 and/or the portions of the openings that are not obstructed by the catalyst 50 in the woven fabric 32 of the air bag as the pressure of the inflation fluid in the air bag rises. As the inflation fluid passes through the openings 40 and/or portions of the openings that are not obstructed by the catalyst 50 in the air bag 12, the inflation fluid contacts the catalyst 50.

The catalyst 50, in combination with the high temperature of the inflation fluid produced by the combustion of the propellant, disassociates any $NO_x$ in the inflation fluid into $N_2$ and $O_2$. The following reduction reactions are examples of the catalytic reduction reactions taking place in the present invention:

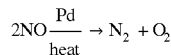

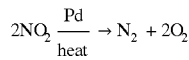

The catalyst 50, by converting or reducing the $NO_x$ in the inflation fluid to $N_2$ and $O_2$, decreases the amount of $NO_x$ in the inflation fluid. Moreover, since the catalyst 50 is metallic, it protects the inner surface 28 of the air bag 12 from the hot temperatures of the inflation fluid. This enables the air bag 12 to be used again in a subsequent occupant protection system after deployment.

From the above description of the invention, those skilled in the art will perceive improvements, changes and modifications. For instance, only the side portions of the air bag 12 could be plated with the catalyst while the front portion could be coated with a gas impermeable material. This would direct the inflation fluid through the sides of the air bag 12 away from the vehicle occupant. Such improvements, changes and modifications within the skill of the art are intended to be covered by the appended claims.

Having described the invention, the following is claimed:

1. Apparatus comprising:
    an inflatable vehicle occupant protection device for, when inflated, helping to protect a vehicle occupant in the event of a vehicle collision, said protection device having an inner surface defining a volume into which vehicle inflation fluid is directed to inflate said protection device;
    a source of inflation fluid which, when actuated, provides inflation fluid for inflating said protection device; and
    a catalytic reducing material for reducing components of said inflation fluid, said catalytic reducing material being adhered to at least a portion of said inner surface of said protection device.

2. The apparatus of claim 1 wherein said reducing material is capable of reducing any oxides of nitrogen present in said protection device.

3. The apparatus of claim 2 wherein said reducing material is metallic.

4. The apparatus of claim 3 wherein said reducing material is a noble metal.

5. The apparatus of claim 4 wherein said reducing material is selected from the group consisting of palladium, platinum, gold, iridium, silver, rhenium, mercury, ruthenium, osmium and rhodium.

6. The apparatus of claim 5 wherein said protection device is an air bag.

7. The apparatus of claim 6 wherein said air bag is made of nylon.

8. An apparatus for use in a vehicle occupant protection device, said apparatus comprising:
    an air bag for, when inflated, helping to protect a vehicle occupant in the event of a vehicle collision, said air bag having an inner surface defining a volume into which inflation fluid is capable of being directed to inflate said air bag; and
    a catalytic reducing material adhered to at least a portion of said inner surface of said air bag.

9. The apparatus of claim 8 wherein said reducing material is capable of reducing any oxides of nitrogen present in said protection device.

10. The apparatus of claim 9 wherein said reducing material is metallic.

11. The apparatus of claim 10 wherein said reducing material is a noble metal.

12. The apparatus of claim 11 wherein said reducing material is selected from the group consisting of palladium, platinum, gold, iridium, silver, rhenium, mercury, ruthenium, osmium and rhodium.

13. The apparatus of claim 12 wherein said air bag is made of nylon.

* * * * *